(12) United States Patent
Wise

(10) Patent No.: US 7,971,898 B2
(45) Date of Patent: Jul. 5, 2011

(54) MULTIPLE LINK, SELF-JACKING WORK CART WA002

(76) Inventor: Robert W. Wise, Petaluma, CA (US)

( * ) Notice: Subject to any disclaimer, the term of this patent is extended or adjusted under 35 U.S.C. 154(b) by 234 days.

(21) Appl. No.: 12/387,353

(22) Filed: Apr. 30, 2009

(65) Prior Publication Data

US 2010/0276910 A1    Nov. 4, 2010

(51) Int. Cl.
*B62B 3/02* (2006.01)

(52) U.S. Cl. ............ 280/651; 280/35; 280/639; 280/42; 280/43.24; 108/79; 248/129; 248/136; 269/17

(58) Field of Classification Search .............. 280/30, 280/638, 35, 639, 42, 651, 652, 659, 43, 280/43.14, 43.24, 47.17–47.2, 47.34, 47.35, 280/79.11, 79.3; 269/17; 108/77, 79; 248/122.1, 248/128, 129, 136
See application file for complete search history.

(56) References Cited

U.S. PATENT DOCUMENTS

| | | | |
|---|---|---|---|
| 1,601,250 A | 9/1926 | Hilderbrand | |
| 2,035,718 A * | 3/1936 | Franks ........................... | 108/79 |
| 2,544,220 A | 3/1951 | Concklin | |
| 2,784,004 A | 3/1957 | Hamrick, Jr. | |
| 3,147,748 A | 9/1964 | Frank | |
| 3,669,031 A | 6/1972 | Cole | |
| 4,230,329 A | 10/1980 | Johnson | |
| 4,284,286 A | 8/1981 | Lewallen | |
| 4,565,382 A | 1/1986 | Sherman | |
| 4,934,718 A | 6/1990 | Voegele | |
| 5,154,441 A | 10/1992 | White et al. | |
| 5,464,236 A * | 11/1995 | Benting et al. .................. | 280/30 |
| 5,505,471 A * | 4/1996 | Cheng ............................ | 280/30 |
| 5,536,034 A | 7/1996 | Miller | |
| 5,863,052 A | 1/1999 | Roman | |
| 5,957,472 A | 9/1999 | Borgatti | |
| 6,328,319 B1 | 12/2001 | Stahler, Sr. | |
| 6,345,829 B1 | 2/2002 | Mueller | |
| 6,364,328 B1 | 4/2002 | Stahler, Sr. | |
| 6,530,583 B1 | 3/2003 | Mueller | |
| 6,578,856 B2 | 6/2003 | Kahle | |
| 2002/0125662 A1 | 9/2002 | Magness | |
| 2005/0012308 A1 * | 1/2005 | Swanner ........................ | 280/652 |

* cited by examiner

*Primary Examiner* — Ruth Ilan
(74) *Attorney, Agent, or Firm* — Black, Lowe & Graham

(57) ABSTRACT

A multiple link, self-jacking mobile work cart includes the main body defining upper and lower portions supported by the plurality of rotating wheels. A multiple link, self-jacking mechanism is provided in connection with two laterally deployable work tables which can serve as infeed/outfeed tables for a power tool or the like supported by the main body of the cart. The multiple link mechanism includes an actuator arm, a linkage arm, a control arm and moveable support legs all pivotally connected to one another such that when the work tables are deployed, substantial weight placed on the tables is transferred to the support legs, rather than the wheels which support the main body.

17 Claims, 5 Drawing Sheets

MULTIPLE LINK, SELF-JACKING WORK CART WA002

TECHNICAL FIELD

The invention relates to mobile stands for powered tools. More specifically, the invention relates to four wheel, mobile stands for power tools such as miter saws, chop saws, task saws, compound sliding circular saws and the like of the type having lateral, attached infeed/outfeed tables.

BACKGROUND OF THE INVENTION

Portable, wheeled tool carts have been available for some time. One such prior art tool cart is shown and described by Wise, the inventor herein, in U.S. Pat. No. 5,642,898 issued Jul. 1, 1997. Additional tool carts have been described in the patent literature. For instance, U.S. Pat. No. 4,955,941, issued Sep. 11, 1990, to Rousseau, describes a support table for a bench saw. U.S. Pat. No. 4,230,329, issued Oct. 28, 1980 to Johnson, describes a mobile cart. U.S. Pat. No. 5,161,590, issued Nov. 10, 1992, to Otto, describes a miter saw table apparatus. U.S. Pat. No. 5,255,724; issued Oct. 26, 1993, to Butke, describes an adjustable extension assembly. A brochure showing the Rousseau SS2850 product discloses a mobile miter saw stand. U.S. Pat. No. 6,886,836 entitled "Counterbalanced Universal Mobile Saw Stand," issued May 3, 2005 to the inventor herein discloses a built-in handtruck design that enables the end user to transport common table saws and equipment to the location of the project being undertaken. The unit quickly folds out into a fully supporting work bench for actual use of the saw and/or equipment. The saw stand shown in the '836 patent is a significant advance in the art in that the device disclosed therein permits a heavy power saw, such as a table saw to be transported to or from a jobsite on roller wheels in the manner of a conventional handtruck. The saw can then be used with the saw stand in a collapsed position (e.g., low to the ground) or in a raised position at table height. This saw stand has a built-in feature that enables the unit to stand in the vertical position with the saw attached. This creates ease in transporting the unit to and from the workplace, i.e., in elevators, truck beds, etc. Also built into the design is the ability to use the saw in the horizontal stowed position for hardwood floor installers, etc.

One disadvantage of this prior art design, as well as other prior art designs discussed above, is that when the saw stand is in the extended or raised position, a significant part of the load is borne by the wheels. The inventor herein has previously invented multi-wheel work benches including a general configuration of a main body and two lateral, extendable infeed/outfeed tables (e.g., U.S. Design Pat. No. D491,709 issued Jun. 15, 2004, title "WORK BENCH," and U.S. Design Pat. No. D535,490 issued Jan. 23, 2007 titled "WORK BENCH"). While these work benches are well adapted for indoor use on smooth floors (e.g., shop floors), they may transmit induced vibrations from a power tool thereon to a work shop floor through wheels. On a smooth, flat surface (e.g., a garage floor, hardwood floors, etc.) vibrations from the saw tend to cause minor movement in the wheels, thus allowing undesirable vibrations to become amplified through positive feedback and reverberate through the saw stand. More significantly, loads placed on the infeed/outfeed tables tend to exacerbate torque applied at the wheels due to the moment effect of the tables on the cart, causing the cart to tip.

The inventor herein addressed that need for a mobile, collapsible power tool stand that can roll on wheels, but that also lifts the saw stand off the wheels when erected or extended in his pending application Ser. No. 11/888,378 filed Jul. 31, 2007, the disclosure of which is herein incorporated by reference. In that disclosure, an extended foot portion is provided adjacent to the wheels at the end of the stand allowing the stand to be raised off its two wheels when deployed. However, for less mobile applications (e.g., a workshop environment with a smooth floor) where tool and work carts employing four wheels are used satisfactorily, a self-jacking anti-tip solution for a mobile tool cart has evaded the ingenuity of the prior art. Thus, a need exists for a self-jacking work cart of the type having four wheels so as to isolate vibrations and other movements from tools, saws, etc. on the cart, and working actions on the cart infeed/outfeed tables from tipping the cart or moving the cart about the floor by virtue of the low frictional engagement therewith due to the wheels.

BRIEF SUMMARY OF THE INVENTION

It is therefore an object of the present invention to provide a multiple link, self-jacking work cart of the type having four wheels which substantially and automatically supports the work cart partially off the wheels when lateral tables on the work cart are deployed.

It is a further object of the present invention to provide a mobile work cart as described above wherein a deploying operation of lateral wings or deployable work tables automatically actuates the self-jacking operation to prevent the cart from tipping when heavy objects are placed on the work tables.

The invention achieves the above objects and other objects and advantages that will become apparent from the description which follows by providing a multiple link, self-jacking mobile work cart including a main body generally supported by four wheels. The work cart includes at least one moveable support leg being pivotable between a stowed position and a deployed position to at least partially support the work cart with respect to a work surface such as a workshop floor. The work cart further includes at least one deployable work table pivotally connected to the work cart to enlarge the scope of the work cart and/or provide one or more laterally extending work surfaces for use as infeed/outfeed tables for a table saw, chop saw or other tool in use on a main body of the work cart. Preferably, deployment of the work table from a stowed position to a deployed position motivates an actuator arm having a first end pivotally connected to the work cart. The control arm is itself is connected to a linkage arm having an upper end pivotally connected to the actuator arm and a lower end pivotally connected to the support leg. Finally, in the preferred embodiment a control arm having a lower end pivotally connected to a free end of the actuator arm, and an upper end pivotally connected to the work table operates such that deployment of the work table from the stowed position to the deployed position lowers the moveable support leg into contact with the support surface, such as the workplace floor. In this way, at least some of the weight supported by the work table is transferred to the support leg so as to provide a higher frictionally engagement between the work cart and the floor and so as to suppress vibratory movement, tipping or displacement of the work cart.

In a preferred embodiment of the invention, a projection of the actuator arm through the work table in the deployed condition is outboard of the connection between the control arm upper end and the work table such that downward force on the work table (such as by an object placed thereupon) translates into further downward force on the support leg against the support surface such as the work room floor rather than inward collapsing movement of the actuator arm towards the stowed position. This effect can be achieved by pivotally connecting the upper end of the linkage arm to the actuator arm at a first distance "a" from the actuator arm first end, and connecting a lower end of the linkage arm to the support leg at a second distance "b" from the support leg upper end whereby downward pressure on the deployable work table causes a greater downward force on the distal end of the actuator arm than the corresponding inward force on the distal end of the actuator arm. By providing the first distance "a" greater than the second distance "b," downward force on the distal end of the actuator arm has a multiplying effect on the rotational torque applied to the upper end of the support leg so as to further force the support leg into the support surface such as the workshop floor. In the preferred embodiments, the control arm and the linkage arm are in the form of yokes and a pair of support legs are provided for each deployable lateral work table and two such work tables are provided. All of the linkages, and the deployable work table are preferably collapsible in the stowed positions such that the work cart can take up as little place in the workshop as possible when not in use, and deployment of the work tables operate the multiple link, self-jacking mechanism to at least partially support weight on the work tables from the workshop floor.

DETAILED DESCRIPTION OF THE PREFERRED EMBODIMENTS

Figure 1:
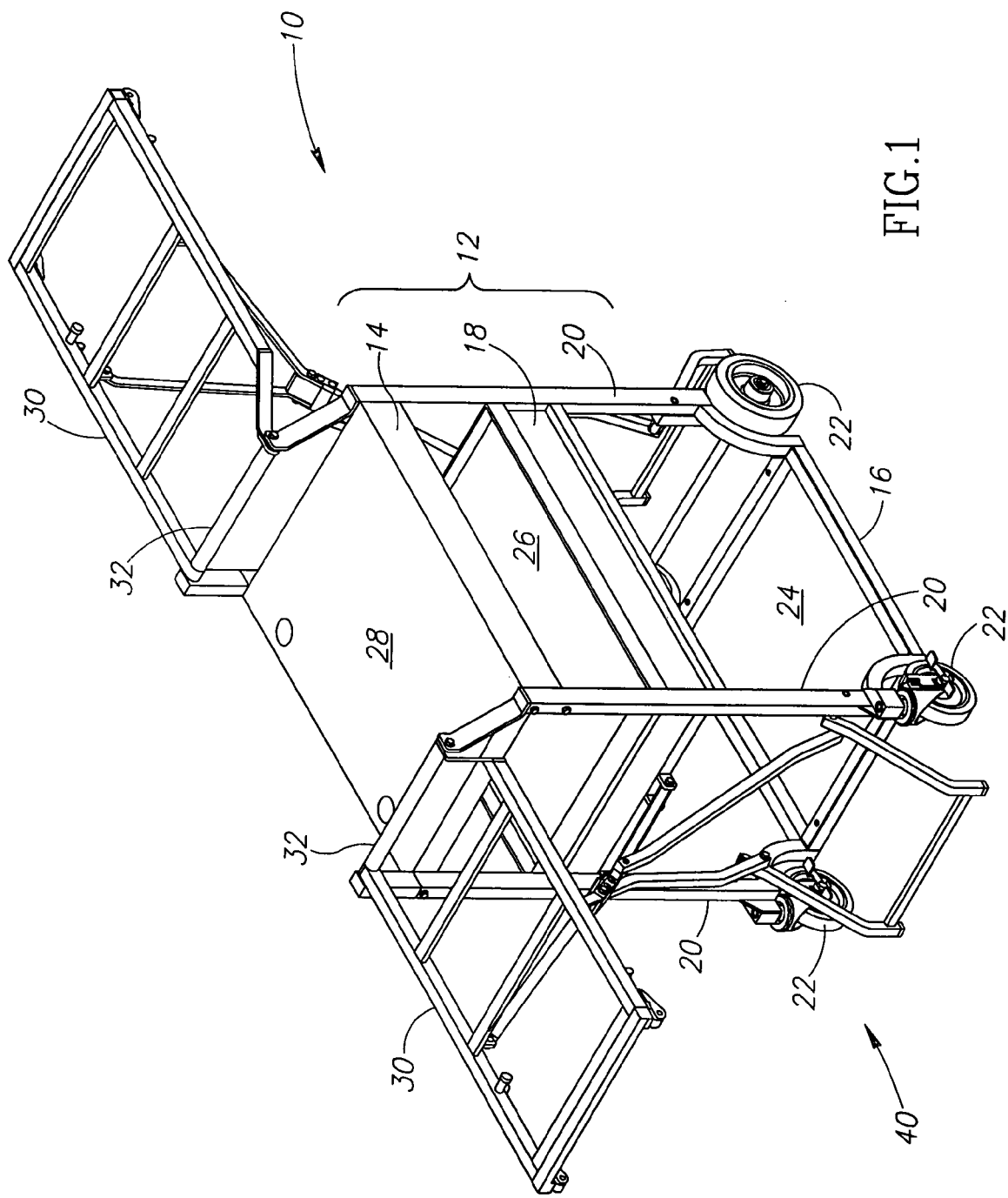
FIG. 1 is an isometric perspective view of a multiple link, self-jacking work cart in accordance with the principles of the present invention.

A multiple-linkage, self-jacking wheeled mobile work cart or cart in accordance with the principles of the invention is generally indicated at reference numeral 10 in the various Figures of the attached drawings, wherein numbered elements in the Figures correspond to like numbered elements herein. The cart 10 has a main body generally indicated at reference numeral 12 consisting of an upper portion 14, a lower portion 16 and an intermediate portion 18 interconnected by four vertical stanchions 20 at lateral edges of the main body which is supported by four rotating wheels 22. The lower portion preferably consists of a shelf 24 for placing tools or the like thereon, while the intermediate portion 18 preferably consists of a drawer 26 also adapted for accepting various hand tools. The upper portion 14 preferably incorporates a power tool base 28 adapted to receive a wide variety of power tools such as table saws, chop saws, drill presses, compound sliding miter saws and the like. As is common with work carts of the type described and as disclosed in my prior design Pat. No. D491,709 issued Jun. 15, 2004 the disclosure of which is incorporated herein by reference the cart 10 advantageously employs laterally deployable work tables 30 on the left and right sides of the main body 12.

Figure 2:
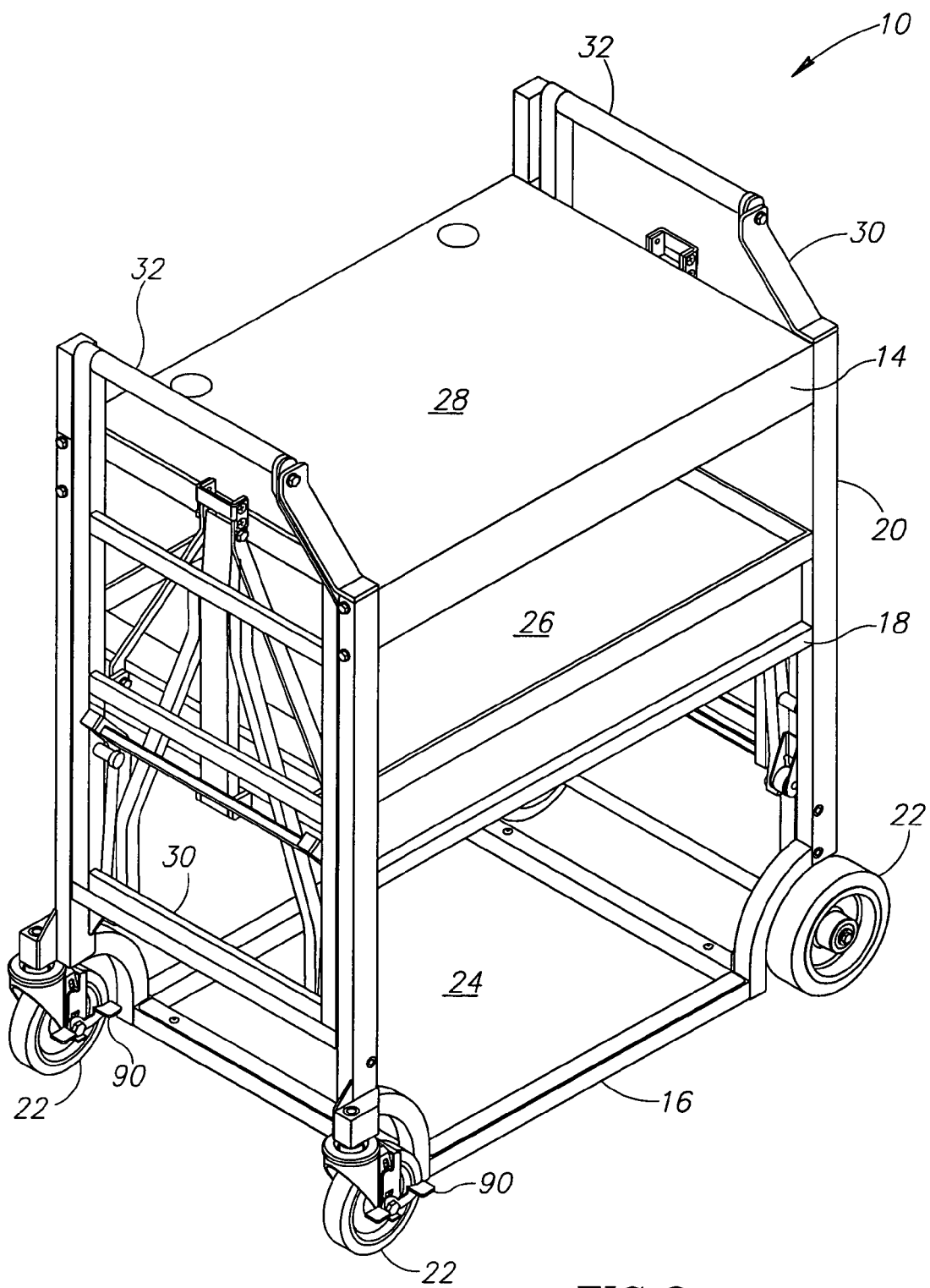
FIG. 2 is a isometric, perspective view of the work cart shown in FIG. 1 with a lateral, extending work table and the associated linkages in a collapsed, stowed position.

The lateral work tables 30 are shown in their deployed positions in FIG. 1, and in their stowed positions for transporting the cart in FIG. 2. The work tables 30 can be advantageously employed as infeed and outfeed tables for a power tool, such as a chop saw (not shown) as discussed above. To that end, the work tables 30 when deployed are at a higher elevation than the power tool support surface 28 such that the working level of the power tool is preferably adjusted so as to be contiguous with the height of the work tables 30. To that end, infeed/outfeed rollers 32 are preferably provided at inboard ends of the work tables 30 to facilitate the sliding movement of a work piece, such as lumber across the tables and onto/from the power tool (not shown). As is apparent from close inspection of the various Figures, the work tables 30 are pivotally attached to the main body 12 of the work cart 10. However, rather than being solely supported by the main body 12, the work cart 10 is advantageously provided with a multiple linkage, self-jacking mechanism generally indicated at reference numeral 40 in the various Figures. A free-bodied diagram of the mechanism is shown in FIG. 4 for further clarity. The multiple linkage mechanism advantageously transfers at least some of the load placed on the work tables 30 to a support surface such as the shop floor 46 so that the weight of heavy articles is not fully transferred to the shop floor through the wheels 22. This feature provides additional stability to the work cart 10 and also permits the use of lighter weight materials for the main body 12 as the weight of heavy objects on the table is at least partially supported through the multiple-linkage, self-jacking mechanism 40. One mechanism is provided for each of the left and right work tables 30 as is apparent from the Figures. Each mechanism 40 consists of a pair of moveable support legs 50. Each leg has an upper end 52 pivotally connected to one of the vertical stanchions 20 at an anchor point 54. A distal free end 56 is adapted for contact with the support surface or shop floor 46. The anchor point 54 is adjacent to the lower portion 16 of the work cart of the main body 12. As stated above, the work tables 30 is pivotally connected to the main body 12 at the upper portion 14 thereof at an anchor point 58 as best seen in FIG. 4. The linkage mechanism 40 is further provided with an actuator arm 60 pivotally connected to the main body 12 intermediate the upper portion 14 and the lower portion 16 at an intermediate anchor point 62 on a transverse frame member 64 of the main body 12 best seen in FIG. 3. A distal free end 66 of the actuator arm 60 is pivotally connected to a lower end of a control arm 68. The control arm 68 has an upper end 69 pivotally connected to the work table 30 at a pivot point 70 inward of a projection of the actuator arm 60 through the work table 30 when the work table is in a deployed, horizontal position. By providing the pivot point 70 inboard of that intersection, any downward component of force (represented by dotted line vector 72) will exceed any inwardly directed force (represented by dotted line vector 74) on the distal free end 66 of the actuator arm 60 when in the deployed condition as shown in FIGS. 1, 3, 4 and 5. Thus, any load on the work table 30 will substantially cause the actuator arm 60 to tend to rotate in a counter-clockwise direction about the intermediate anchor point 62 so as to transfer any such vertical load to a linkage arm 76 having an upper end 78 pivotally connected to the actuator arm 60 at a first distance "a" from the intermediate anchor point 62. The linkage arm 76 has a lower end 82 pivotally connected to the support leg 50 at a second distance "b" from the lower anchor point 54. By selecting the pivotal connection distances "a" and "b" such that "a" is at least larger than "b," and preferably the first distance "a" being at least twice as great the second distance "b" a multiplier effect is provided such that any downwardly torque induced around the intermediate anchor point 62 is multiplied and magnified when transferred to the support leg 50 rotating about the lower anchor point 54 so as to force the distal free end 56 of the support leg against the support surface 46. It will be apparent to those of ordinary skill in the art that the multiple link mechanism 40 if adapted to the geometry described above substantially transmits loads placed on the work tables 30 to the floor 46 rather than to the wheels 22 of the cart 10. In addition, loads placed on the tables 30 now react against a fulcrum defined by the outboard free ends 56 of the legs 50 rather than by the more inboard fulcrum represented by the wheels 22. As a result, the cart 10 is less prone to tipping when a heavy load is placed on one of the tables 30.

Figure 3:
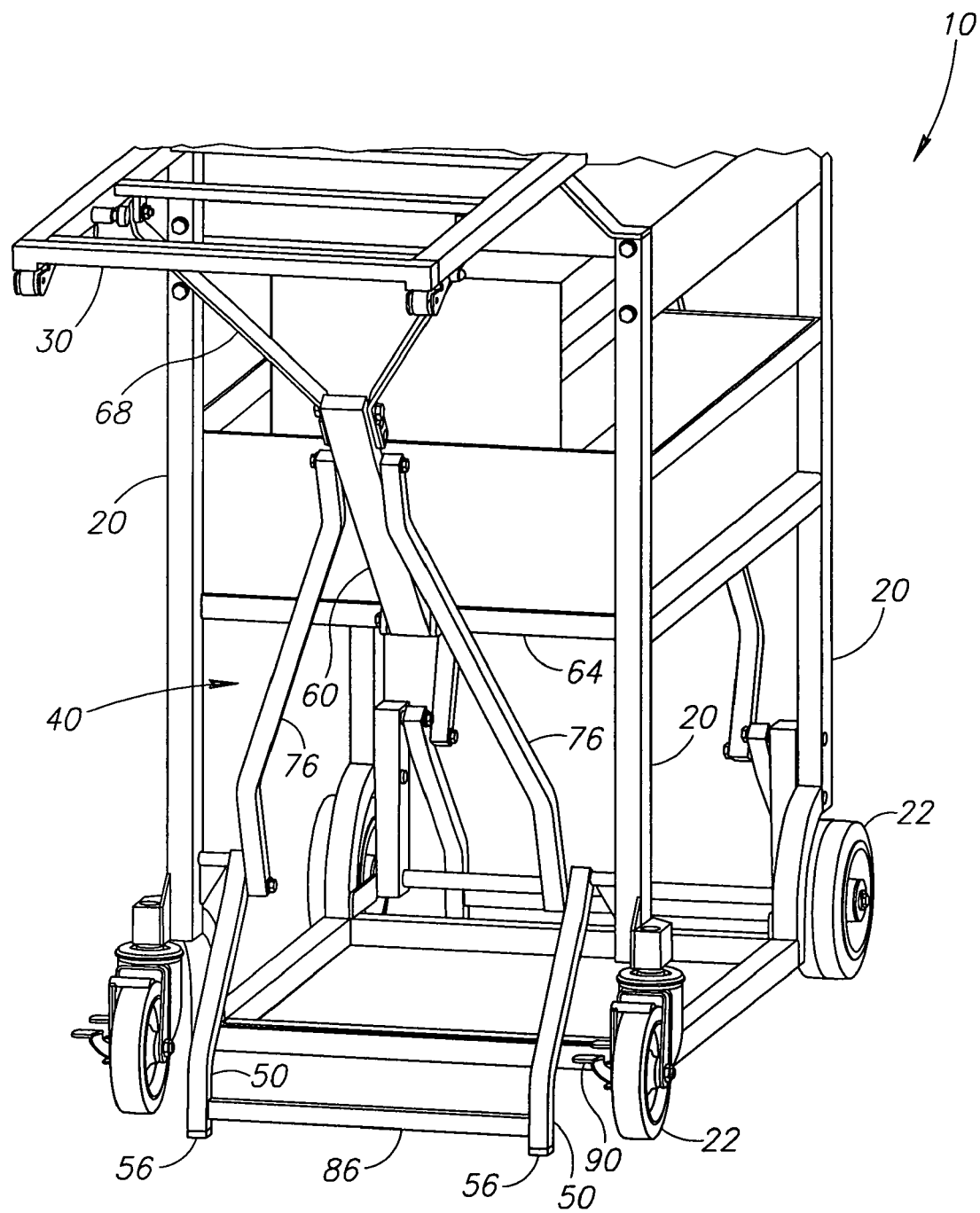
FIG. 3 is an enlarged, sectional partial perspective view of the work cart showing one deployable work table, moveable support legs, actuator arm, control arm and linkage arm all in the deployed, weight supporting position.
Figure 4:
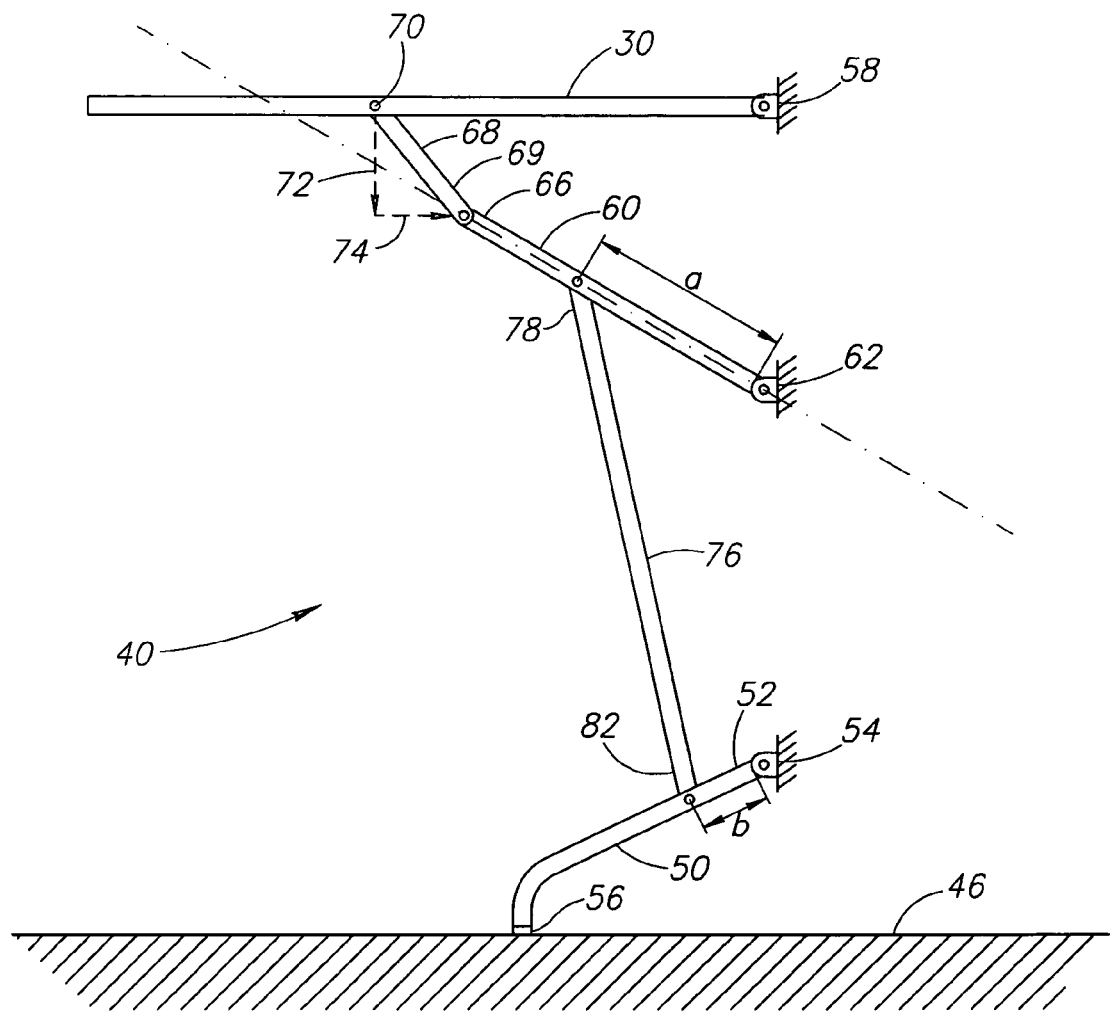
FIG. 4 is a free body diagram showing one deployable work table, the actuator arm, the linkage arm and the control arm including the moveable support legs all in the extended, deployed, weight supporting positions.
Figure 5:
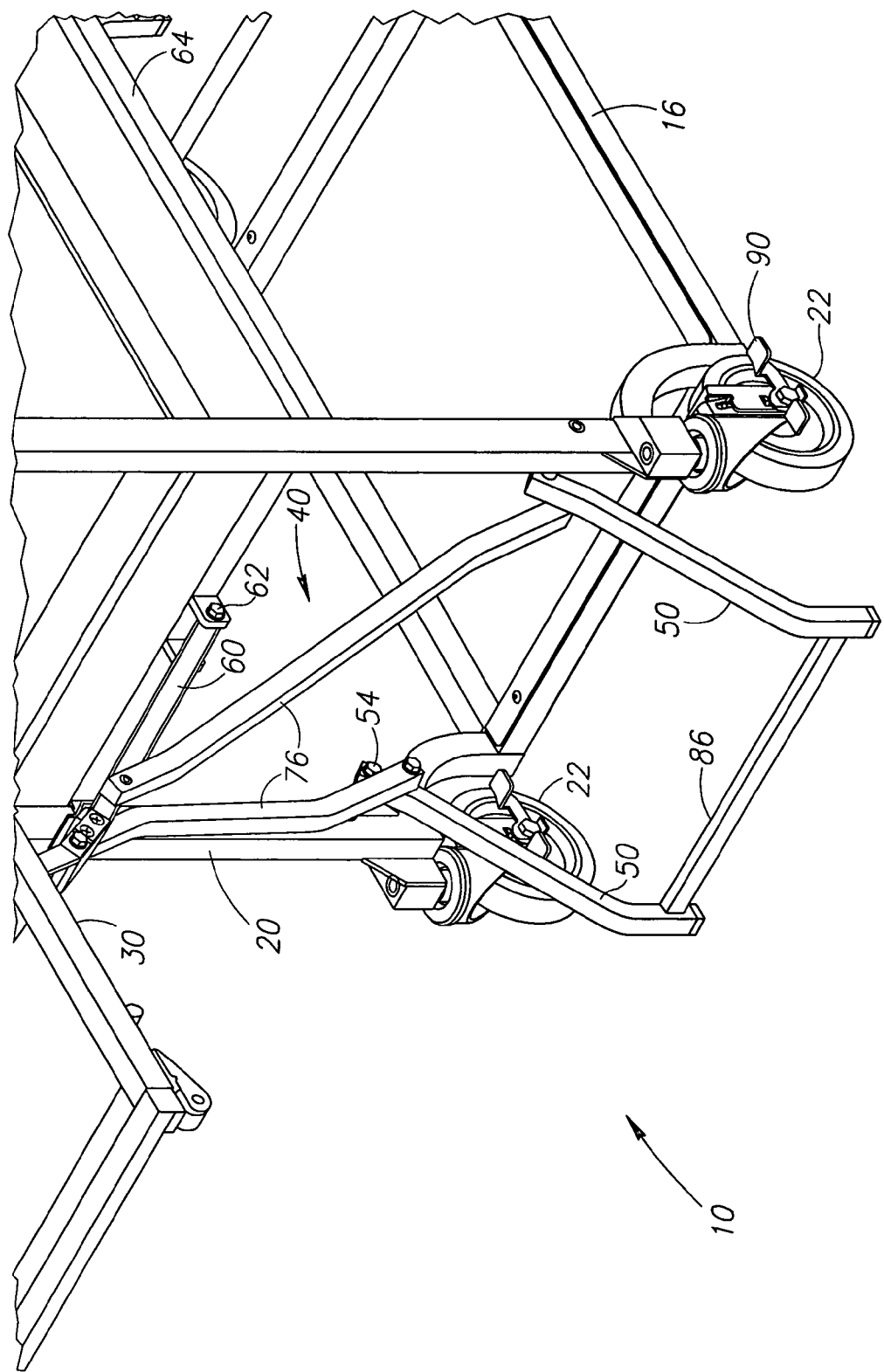
FIG. 5 is an enlarged, close up perspective view of the moveable support legs, deployable work table, actuator arm, linkage arm and control arms in the deployed condition.

As best seen in FIG. 3, the support legs 50 are provided in pairs on each lateral side of the work cart 10 and are fortified by a transverse crossbar 86 in the conventional manner. Furthermore, the linkage arm 76 is in the form of a yoke having left and right sides as is the control arm 68. Providing the transverse cross bar 86, linkage arm 76, and the control arm 68 in the form of yokes substantially increases the strength of the multiple linkage, self-jacking mechanism 40 permitting higher loads to be placed on the work tables 30.

With reference to FIG. 2, those of ordinary skill in the art will readily appreciate that the work tables 30, and associated control arm 68, actuator arm 60, linkage arm 76 and moveable support legs 50 are all configured to collapse and nest into a self-contained arrangement to minimize storage space needed by the cart 10 when the cart and any associated power tool thereon (not shown) are not in use. Two or more of the four wheels 22 can be provided with conventional brakes 90 to prevent the cart from rolling on an uneven support surface when not in use.

Those of ordinary skill in the art will conceive of other alternate embodiments of the invention upon reviewing this disclosure. Thus, the invention is not to be limited to the above description, but is to be determined in scope by the claims which follow.

I claim:

1. A multiple link, self jacking mobile work cart, comprising:
   a main body defining an upper portion and a lower portion supported by a plurality of rotating wheels;
   a movable support leg, the support leg having an upper end pivotally connected to the work cart adjacent to the work cart main body lower portion and a distal free end adapted to support the cart on a support surface, the support leg being movable between a stowed position and a deployed position;
   a deployable work table pivotally connected to the work cart main body at the upper portion thereof, the table being movable between a stowed position and a deployed position;
   an actuator arm having a first end pivotally connected to the work cart main body intermediate the support leg and the work table and having a distal free end;
   a linkage arm having an upper end pivotally connected to the actuator arm at a first distance "a" from the actuator arm first end, and a lower end pivotally connected to the support leg at a second distance "b" from the support leg upper end; and
   a control arm having a lower end pivotally connected adjacent to the free end of the actuator arm and an upper end pivotally connected to the work table such that a projection of the actuator arm through the work table in the deployed condition is outboard of the connection between the control arm upper end and the work table main body whereby deploying the work table deploys the support leg into contact with the support surface to stabilize the cart.

2. The work cart of claim 1, wherein the first distance "a" is greater than the second distance "b".

3. The work cart of claim 1, wherein the first distance "a" is at least twice as great as the second distance "b".

4. The work cart of claim 1, wherein each of the support leg, linkage arm and control arm is provided as part of a pair.

5. The work cart of claim 4, wherein the work cart main body has four wheels.

6. The work cart of claim 5, including a second set of support legs, a second work table, actuator arm, linkage arm and control arm.

7. The work cart of claim 6, wherein the control arm and linkage arm are in the form of yokes.

8. The work cart of claim 1, wherein the control arm and linkage arm are in the form of yokes.

9. The work cart of claim 8, including a second set of support legs, a second work table, actuator arm, linkage arm and control arm.

10. A multiple link self jacking mechanism for a mobile work cart, comprising:
    a movable support leg, the support leg having an upper end pivotally connected to the work cart adjacent to a lower portion thereof and a distal free end adapted to support the work cart on a support surface, the support leg being movable between a stowed position and a deployed position;
    a deployable work table pivotally connected to the work cart at an upper portion thereof, the table being movable between a stowed position and a deployed position;
    an actuator arm having a first end pivotally connected to the work cart intermediate the support leg and the work table and having a distal free end;
    a linkage arm having an upper end pivotally connected to the actuator arm at a first distance "a" from the actuator arm first end, and a lower end pivotally connected to the support leg at a second distance "b" from the support leg upper end; and
    a control arm having a lower end pivotally connected adjacent to the free end of the actuator arm and an upper end pivotally connected to the work table such that a projection of the actuator arm through the work table in the deployed condition is outboard of the connection between the control arm upper end and the work table whereby deploying the work table deploys the support leg into contact with the support surface to stabilize the cart.

11. The mechanism of claim 10, wherein the first distance "a" is greater than the second distance "b".

12. The mechanism of claim 10, wherein the first distance "a" is at least twice as great as the second distance "b".

13. The mechanism of claim 10, wherein each of the support leg, linkage arm and control arm is provided as part of a pair.

14. The mechanism of claim 13, wherein the cart includes a main body having four wheels.

15. The mechanism of claim 14, including a second set of support legs, a second work table, actuator arm, linkage arm and control arm.

16. The mechanism of claim 15, wherein the control arm and linkage arm are in the form of yokes.

17. The mechanism of claim 10, wherein the control arm and linkage arm are in the form of yokes.

* * * * *